United States Patent [19]

Stopp

[11] 4,335,925
[45] Jun. 22, 1982

[54] THRUST BEARING

[75] Inventor: Peter G. Stopp, Hillingdon, England

[73] Assignee: The Glacier Metal Company, Limited, Middlesex, England

[21] Appl. No.: 197,349

[22] PCT Filed: Oct. 31, 1979

[86] PCT No.: PCT/GB79/00173
§ 371 Date: Jul. 2, 1980
§ 102(e) Date: Jul. 2, 1980

[87] PCT Pub. No.: WO80/00994
PCT Pub. Date: May 15, 1980

[30] Foreign Application Priority Data

Nov. 2, 1978 [GB] United Kingdom ............... 42945/78

[51] Int. Cl.³ .............................................. F16C 17/06
[52] U.S. Cl. ..................................... 308/160; 308/170
[58] Field of Search ................ 308/160, 161, 168, 170

[56] References Cited

U.S. PATENT DOCUMENTS

| 2,102,534 | 12/1937 | Howarth | 308/160 |
| 2,565,116 | 8/1951 | Baudry | 308/160 |
| 2,874,007 | 2/1959 | Cametti et al. | 308/160 |
| 3,586,401 | 6/1971 | Gravelle | 308/160 |
| 3,655,250 | 4/1972 | Sprenger | 308/160 |
| 3,912,344 | 10/1975 | McCafferty | 308/160 |

FOREIGN PATENT DOCUMENTS

| 642806 | 6/1962 | Canada | 308/160 |
| 185635 | 8/1966 | U.S.S.R. | 308/160 |
| 631704 | 11/1978 | U.S.S.R. | 308/160 |

Primary Examiner—Richard R. Stearns
Attorney, Agent, or Firm—Oblon, Fisher, Spivak, McClelland & Maier

[57] ABSTRACT

This invention is a tilting thrust pad bearing in which bearing pads 11 are supported on individual pillars 19 which themselves bear on supporting bars 23, carried by rockers 24. The supporting bars and rockers are identical components and can be used in different numbers for large diameter and small diameter bearings, while yet where they support one another, there can be one point or two point connection by virtue of an arcuate ridge 41 at one end of each component, and a slightly domed surface 43 at the other end of each component.

9 Claims, 8 Drawing Figures

THRUST BEARING

This invention relates to thrust bearings of the kind having a ring of thrust pads, which between them define an annular thrust bearing surface, and which are individually mounted to be capable of tilting about radial axes, to permit a wedge of lubricant to be built up between each pad, and the co-operating bearing surface which is for example, the surface of a collar on a rotating shaft.

An object of the invention, is to provide a particularly simple arrangement for supporting the individual thrust pads, and for interconnecting the individual supports, so that thrust loads tend to be borne more-or-less equally between the pads.

According to the present invention, a thrust bearing comprises a ring of thrust pads, supporting bars, each supporting one of the thrust pads, and a ring of rockers, the rockers in an adjacent pair having ends overlapping and supporting respective ends of a supporting bar, all the rockers and supporting bars being identical components.

In the past very complicated arrangements have been proposed containing many different components for interconnecting the supporting bars or their equivalent to allow the loads to be transferred between the pads while yet providing for satisfactory support of the supporting bars without them slipping in relation to their neighbours, or sliding about in the bearing.

The present invention uses identical components for the rockers and for the supporting bars with considerable simplification in the assembly. Moreover the identical components can be so shaped in the direction in which thrust is supported, that the same components can be used for a large diameter thrust bearing with many pads, and for a small diameter thrust bearing with fewer pads. Thus, the identical components may have their ends which are circumferentially spaced from the ends of their neighbours of convex rounded shape when seen in the direction of the bearing axis.

The overlapping parts of the ends at one side of the components are conveniently each formed with an arcuate ridge in such a way that where the respective ends of a rocker and a supporting bar overlap, there are two abutment regions where the ridges cross one another. Then even if the angle between the components is increased or decreased for a larger or smaller diameter bearing, there can still be two abutment regions where the arcuate ridges cross one another, and there can be three point suspension for each component provided at the two abutment regions at one side, and a single abutment region at the other side.

The arcuate ridge can be defined by a lip of rounded cross section adjacent the convex end of the component defined by a depression in the surface of the component just inside that rounded lip.

The invention may be carried into practice in various ways, and one embodiment will now be described by way of example, with reference to the accompanying drawings in which.

Figure 1:
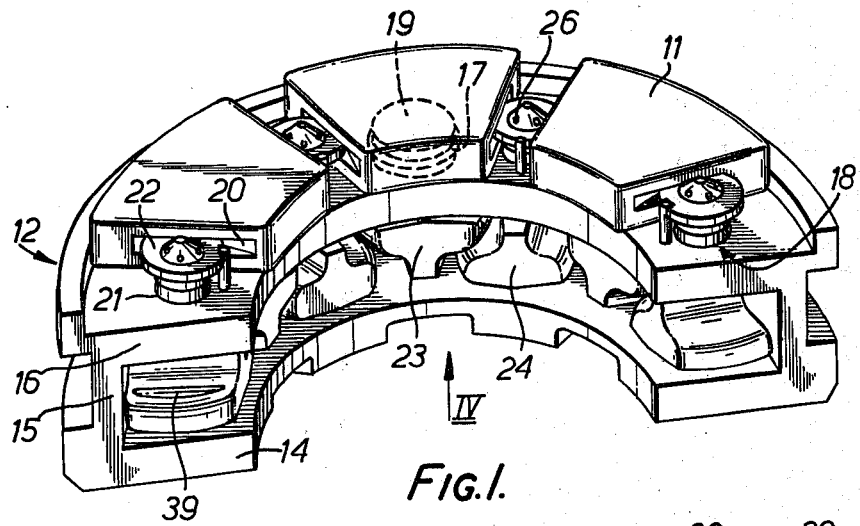
FIG. 1 is a perspective view of one half of a thrust bearing.

The bearing comprises an annular ring through which a shaft can pass, which shaft carries an external collar which during rotation of the shaft acts on a ring of eight thrust pads 11 forming a part of the bearing to carry thrust loads on the shaft.

In order to enable it to be assembled, the bearing is in two diametrically separable halves 12, which can be assembled together around the shaft and held in position by a circlip (not shown). Each half comprises a semi-annular body defining a base 14, an outer wall 15, and a shelf 16. The shelf is formed with circumferentially spaced alternate bores 17 and 18 respectively for pillars 19 for supporting the thrust pads 11, and lubricant posts 21 terminating at their outer ends in external flanges 22 fitting in grooves 20 in the sides of the pads 11 to locate the pads circumferentially, and having a ring of holes 26 through which lubricant can be sprayed around the spaced between adjacent pads.

Each pad 11 sits on the outer end of its own pillar 19 which is flat ended, but the underface of the pad has a radially directed ridge 27 formed on it, so that the pad can tilt about a radial direction defined by that ridge in accordance with loads experienced during rotation of the shaft and its collar.

At its inner end, each pillar is formed with a radially directed web 28 with a rounded inner end, which is seated in a correspondingly shaped notch 29 in a supporting bar 23, so that the supporting bar can tilt in relation to the pillar about a radial axis defined by the end of the web.

Between each adjacent pair of supporting bars 23 is a rocker 24, which is in fact identical with the supporting bar. In the case of a rocker however, the notch can turn about a radially directed web 25 with a cylindrical end carried on the base 14. The component which can be used as a supporting bar or as a rocker is termed a levelling plate.

Figure 2:
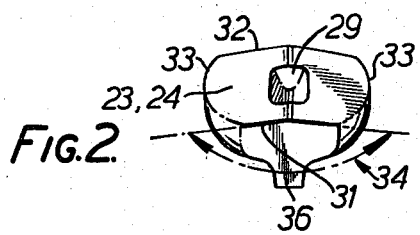
FIGS. 2 and 3 are perspective views of a levelling plate used in the bearing of FIG. 1.
Figure 3:
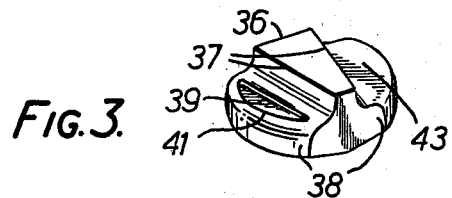

The form of the levelling plate is shown in FIGS. 2 and 3. One face has a pair of opposed parallel sides 31 and 32, the latter of which is longer than the former, and they are joined by curved ends 33. The surface is in two symmetrical parts which meet at a central radial line at an angle of a little less than 180°, as indicated at 34, and the notch 29 is positioned centrally along that line.

On the other side of the levelling plate, there is a central radially directed web 36 with inclined sides 37, as shown in FIG. 3, and that leaves a shelf 38 on either side of the main body of the levelling plate. At one side the shelf 38 is slightly domed shape, while at the other side the shelf is cut away, as shown at 39 to leave an arcuate peripheral ridge 41 extending from one of the straight sides 31 to the other 32.

In making up a bearing, a number of pads 11 will be selected, the shape of which, and the number of which, depends upon the diameter of the particular bearing. The bearing requires twice that number of the levelling plates, half of which are mounted on the base 14 for use as rockers, while the other half are inverted and mounted between them for use as supporting bars.

Figure 4:
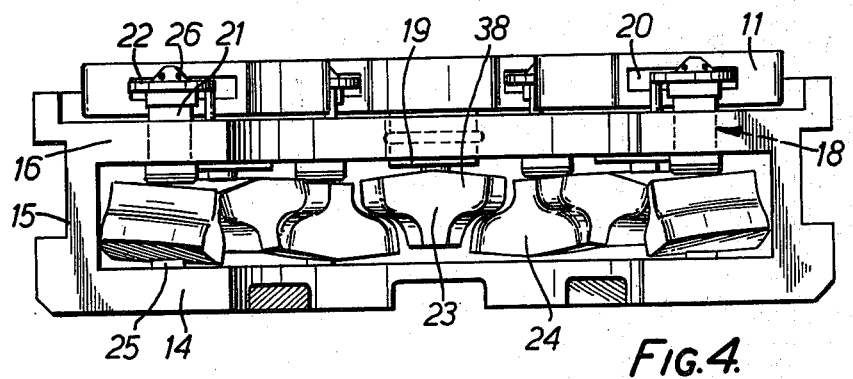
FIG. 4 is an elevation looking in the direction of the arrow IV in FIG. 1.
Figure 5:
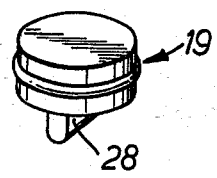
FIG. 5 is a perspective view of a pillar in the bearing of FIG. 1.
Figure 6:
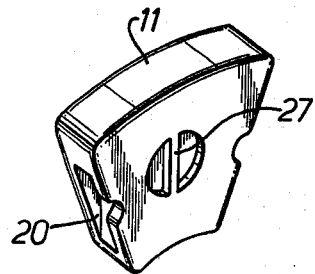
FIG. 6 is a perspective view of a thrust pad in the bearing of FIG. 1.

It will be appreciated, particularly from FIGS. 1 and 4, that if one of the pads 11 carries an axial load greater than the others, that will be transmitted to the supporting bar below it, and that will in turn be transmitted through its two shelves 38 to the corresponding shelves of the rockers 24 on either side which will in turn impart that thrust to the base 14. If, as suggested above, the thrust on one pad is greater than that of the adjacent pads, the result will be that the supporting bars and rockers tilt about their radial pivots, so that the pads on either side tend to rise from the shelf 16 to tend to take more than their share of the load, and thus to tend to equalise the load so that it is shared more or less equally between all the pads 11.

It will be appreciated that each of the supporting bars and rockers is in contact at its notch 29, either with a web 28 on a pillar 19, or with a web 25 on the base 14, and is in contact at each of its shelves 38 with a corresponding shelf of an adjacent rocker or supporting bar.

It is the aim of the present invention to ensure that each bar or rocker has its shelves in contact with adjacent shelves only at three points, two at one side of the radial pivot axis 29, and one at the other side.

Figure 7:
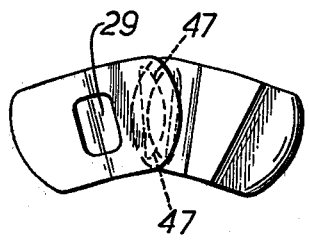
FIGS. 7 and 8 are diagrams showing how cooperating levelling plates bear on one another at respective sides.

At one side the faces of the shelves 38 are slightly domed at 43 so that there will be contact between a supporting bar shelf and a rocker shelf only at one point. At the other side, each shelf is formed with the arcuate ridge 41, so that as shown in FIG. 7 there will be two local areas of contact 47 where the two ridges 41, one from each shelf cross one another.

The construction described is simple and economical, partly because identical components are used for supporting bars and rockers, but partly also because identical supporting bars and rockers can be used for different bearings with a wide range of different diameters.

Thus if a thrust bearing is to have, say, fourteen bearing pads 11 rather than the eight shown in FIG. 1, there will be twenty-eight levelling plates, rather than the sixteen of FIG. 1, but they can be the identical components spaced apart in a ring of larger diameter.

Figure 8:
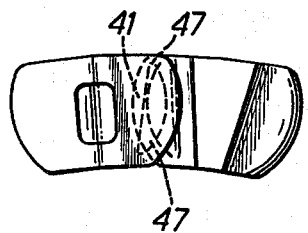

As shown in FIG. 8, where supporting bars and rockers act on one another, there will still be the two point support at one side, even though it is at a different part of the arcuate ridges 41 by reason of the greater diameter of the circle of components.

In that way, bearings for different applications can be built up from standard components with a considerable saving in cost.

The shelf 16 serves to locate the pillars 19 and the lubricant posts 21 circumferentially, but does not in fact carry any of the axial load applied to each of the thrust pads 11.

It is believed that the components shown in FIGS. 2 and 3, can be used for bearings having any number of thrust pads between six and sixteen and consequently, with between six and sixteen supporting bars 23, and between six and sixteen rockers 24.

I claim:

1. A thrust bearing comprising a ring of thrust pads, supporting bars, each supporting one of said thrust pads, and a ring of rockers, each adjacent pair of said rockers having ends overlapping and supporting respective ends of one of said supporting bars, all of said rockers and said supporting bars being identical components, the improvement comprising that said overlapping parts of said ends at one side of said components are each formed with an arcuate ridge, in such a way that where respective ends of a rocker and supporting bar overlap, there are two abutment regions where said ridges cross one another, while at the other side of said rocker and said supporting bar, said components are shaped such that there is a single abutment region.

2. The bearing of claim 1 in which said overlapping ends of said identical components are of convex rounded shape when seen in the direction of the bearing axis.

3. The bearing of claim 2 in which said rockers are shaped and arranged to be capable of rocking in relation to a bearing housing about a generally radial line.

4. The bearing of claim 3 in which said supporting bars are shaped and arranged to rock in relation to their thrust pads about a generally radial line.

5. The bearing of claim 4 in which said identical components are each formed with a ridge defining the radial rocking line.

6. The bearing of claim 5 in which said thrust pads are shaped and arranged to be capable of rocking about a generally radial line in relation to their supporting bars.

7. The bearing of claim 6 further comprising a pillar positioned between each thrust pad and its supporting bar with means permitting said thrust pad to rock in relation to its pillar about a first radial line, and additional means permitting said supporting bar to rock in relation to said pillar about a second radial line axially spaced from said first radial line.

8. The bearing of claim 7 further comprising a lubricant delivery post, positioned between adjacent pairs of thrust pads, and acting to separate said thrust pads circumferentially, and also acting to lubricate the region between said thrust pads.

9. The bearing of claim 8 further comprising a shelf with a ring of apertures respectively for locating said pillars and said posts circumferentially in relation to each other.

* * * * *